US006973336B2

(12) United States Patent
Heie

(10) Patent No.: US 6,973,336 B2
(45) Date of Patent: Dec. 6, 2005

(54) METHOD AND APPARATUS FOR PROVIDING A NOTIFICATION OF RECEIVED MESSAGE

(75) Inventor: Anders Heie, Poway, CA (US)

(73) Assignee: Nokia Corp, Espoo (FI)

( * ) Notice: Subject to any disclaimer, the term of this patent is extended or adjusted under 35 U.S.C. 154(b) by 564 days.

(21) Appl. No.: 09/742,709

(22) Filed: Dec. 20, 2000

(65) Prior Publication Data

US 2002/0111198 A1 Aug. 15, 2002

(51) Int. Cl.$^{7}$ ............................ H04B 1/38; H04M 1/00
(52) U.S. Cl. ...................... 455/574; 455/567; 455/425; 455/414.4
(58) Field of Search .......................... 455/412.2, 412.1, 455/413, 414.1, 414.2, 414.4, 423, 426.1, 455/456.5, 425, 550, 567, 566, 572, 574, 455/550.1, 456.3; 379/88.12; 340/7.2, 7.54

(56) References Cited

U.S. PATENT DOCUMENTS 5,568,134 A * 10/1996 Cannon et al. ............ 340/7.54
5,861,818 A * 1/1999 Ohtsuki ...................... 455/140
6,044,262 A * 3/2000 Hirayama ................ 455/412.2
6,133,848 A * 10/2000 Kudoh ...................... 379/67.1
6,195,571 B1 * 2/2001 Osuge ........................ 455/567
6,215,993 B1 * 4/2001 Ulveland .................... 455/415
6,249,668 B1 * 6/2001 Abe et al. ..................... 340/7.2
6,408,187 B1 * 6/2002 Merriam ..................... 455/567
6,549,792 B1 * 4/2003 Cannon et al. .......... 455/550.1

* cited by examiner

*Primary Examiner*—Nick Corsaro

*Assistant Examiner*—John J. Lee

(74) *Attorney, Agent, or Firm*—Tom Weber; Milan Patel

(57) ABSTRACT

The present invention is directed to a method and apparatus for providing a notification of a received message when the user may not have received the initial alert. An auto notification feature is provided, such that if the apparatus upon receiving a message detects no movement, then an additional alert is provided upon the apparatus detecting a movement. Also, if the user has not acknowledged the receipt of a message, then the most efficient method of providing alert is used for all the subsequent messages received.

28 Claims, 4 Drawing Sheets

METHOD AND APPARATUS FOR PROVIDING A NOTIFICATION OF RECEIVED MESSAGE

FIELD OF THE INVENTION

The present invention relates to an electronic device having an electronic phonebook, more particularly, to a method and apparatus for providing a notification that a page or a call was received.

BACKGROUND OF THE INVENTION

A wireless communication system is a communication system in which information is communicated between a transmitting station and a receiving station. A cellular or digital communication system is exemplary of a multi-user wireless communication system. One of the fastest growing areas of technology at the time of filing the present application is the area of one-way communication. In the one-way communication system, the transmitting station initiates a call request to transmits information (such as page, text message, short sequence message, etc.) to a receiving station. In the one-way communication system, the receiving station is only notified of the received information and is not required to provide a response to the call request.

Generally, the receiving station comprising a portable mobile communication device, such as a pager or mobile terminal, is used to implement the one-way communication system for communicating information between the transmitting station and the receiving station. To notify the user of the received information (also referred to as a message), typically, the receiving terminal is preset to provide one or more predetermine alerts upon receiving the transmitted information. If the receiving station is within the user general vicinity, carried by the user or is attached to the user, then the user is able to quickly access the received information. Generally, the user actuates one or more keys to turn off the alert before or after checking the receiving message. If the user does not respond by actuating a preset acknowledgement key, then all the preset alerts may be executed and the message is stored in memory. Once the message is stored in the memory, generally no additional alerts are executed until a new message is received.

There are many situations when the user is away from the receiving terminal at the time the transmitted information is received. In these situations, the user may not see or hear the alerts. For example if the user has left the receiving station in a briefcase or a purse and is away when a message is received, the user may not be aware that a message was received. In this situation, the user may not know of received message until the user picks up the receiving terminal itself. If the user picks up the briefcase or the purse containing the receiving terminal, the user may not know that a message was received.

To insure that the user is notified of a received message, several techniques have been implemented. One such technique is to continue executing the alerts until the user actuates the preset acknowledgement key. Another technique is to periodically re-execute the alerts. However, these techniques waste battery power if the user does not acknowledge the receipt of a message for few hours, especially when multiple messages are received without the user acknowledging the receipt. Furthermore, these techniques are not useful if the user has set the alert mode to non-audible mode and the receiving terminal is out of user's sight.

Therefore, it would be useful if the receiving terminal could provide one or more alerts in response to any movement of the receiving terminal when no movement was detected after to receiving a message.

SUMMARY OF THE INVENTION

The present invention advantageously provides an apparatus and an associated method, for an electronic device to adequately provide a notification that a message was received.

The present invention encompasses an electronic device, such as a mobile terminal, a pager, a personal digital assistant (PDA) or a portable computer, which may be operated in a communication system (for example CDMA, TDMA, GSM, etc.). The electronic device comprises a method of receiving messages, such as a page, text message or a short sequence message (SMS), and providing an alert to notify the user that a message was received. The electronic device comprising apparatus and a method for providing one or more additional alerts upon detecting movement of the electronic device after providing an initial alert upon receiving a message. The additional alerts may comprise a single alert or may comprise a series of predetermined alerts varying in strength. Additionally, if no movement was detected after a predetermined time, then only a pre-selected alert (generally one that requires the lowest power) is executed for all the messages received until a movement is detected or the user acknowledges the receipt of a message.

A more complete appreciation of all the advantages and scope of the present invention can be obtained from the accompanying drawings, the following detailed description of the invention, and the appended claims.

DETAILED DESCRIPTION OF THE INVENTION

Figure 1:
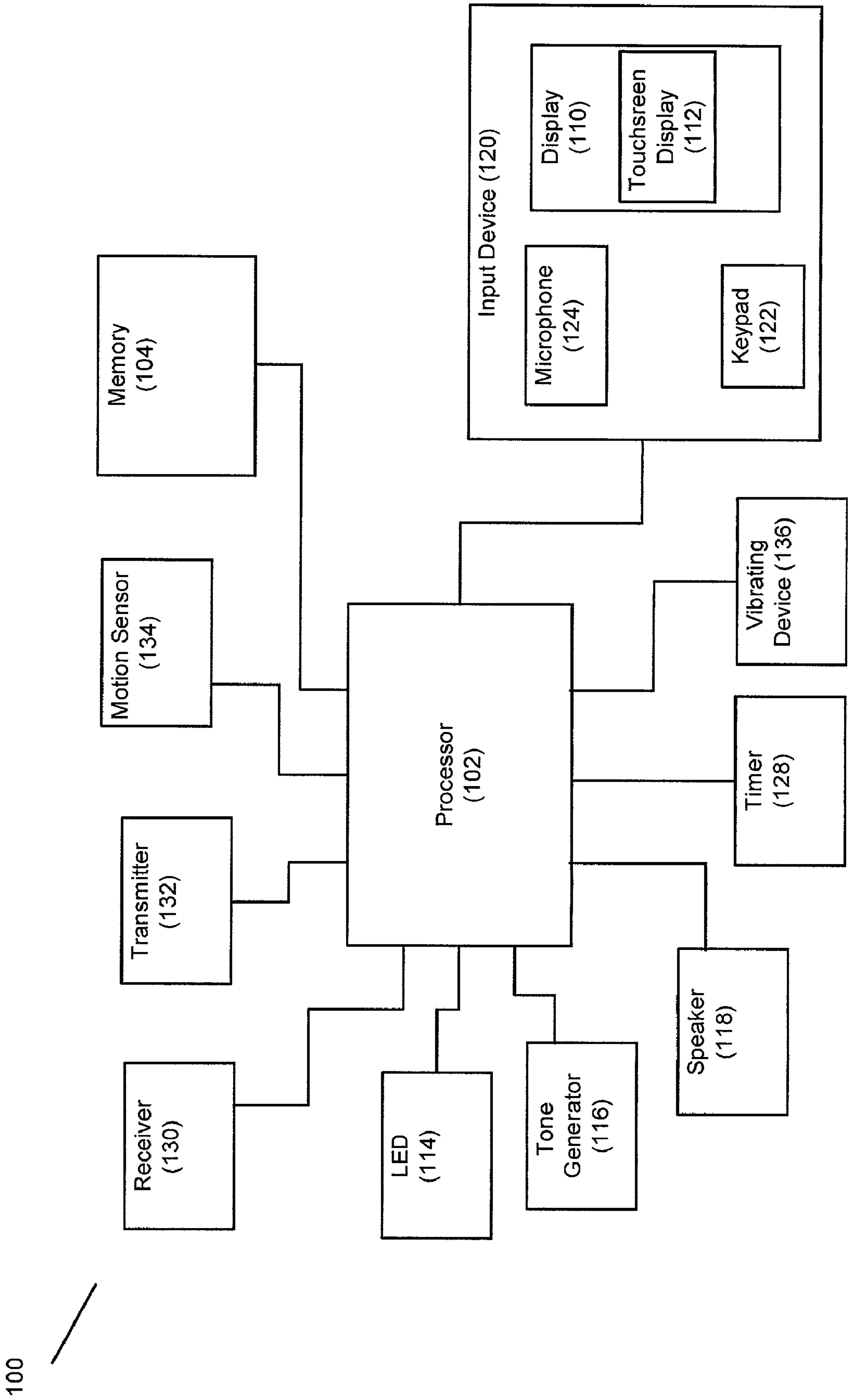
FIG. 1 illustrates a block diagram of a mobile terminal into which an embodiment of the invention may be implemented.

FIG. 1 is a block diagram of the electronic device, such as a mobile terminal 100, according to an embodiment of the invention. Generally, the mobile terminal 100 includes a controller 102 (which may also be known as a processor 102) coupled to various memories, collectively shown as memory 104. Memory 104 includes a plurality of stored constants and variables that are used by processor 102 during the operation of the electronic device 100. For example, memory 104 stores the values of the various feature parameters and the Number Assignment Module (NAM). An operating program for controlling the operation of processor 102 is also stored in memory 104 (typically in a read only memory). Memory 104 is also used to store data provided by the user through the user interface. Furthermore, memory 104 is used to hold the subprograms or sub-processes for controlling the operation of mobile terminal 100 and carrying out the embodiment of the invention.

The operating program in memory 104 includes routines for adequately providing a notification to the user of a received message.

The user interface of the mobile terminal 100 also includes a Liquid Crystal Display (LCD) 110, a touch-screen display 112, Light Emitting Diode (LED) 114, tone generator 116, speaker 118 and user input device 120, comprising alpha-numeric keypad 122, all of which are coupled to processor 102. The input device may also comprise microphone 124 for generating input and the touch screen display 112. Mobile terminal 100 also comprises timer 128 (also referred to as a clock chip) coupled to processor 102 for synchronizing the operations of processor 102 and tracking time.

The exemplary mobile terminal 100 also includes a receiver 130, transmitter 132, coupled to the processor 102. The processor 102, coupled to the transmitter 132 and the receiver 130, initiates the transmission of outgoing signals and processes incoming signals, respectively. These signals may include signaling information in accordance with the air interface of the applicable cellular or digital system and also user speech and/or user generated data.

The exemplary mobile terminal 100 also includes a motion sensor 134 for detecting a motion of the mobile terminal 100. The motion sensor 134 is couple to the processor 102, which may be activated and deactivated by the processor 102.

Generally, a message is received via the receiver 130, and stored in the memory 102. The message may be a page comprising a called parties phone number. The message may also be a text message or a short sequence message (SMS). In a one-way communication system, a notification is provided to the user upon receiving any message.

In an exemplary implementation of an electronic device, analogous to the mobile terminal 100, a motion sensor 134 is provided for detecting motion of the mobile terminal 100. Using the menu feature of the mobile terminal 100, the user may activate the auto notification feature of the mobile terminal 100 and setup the parameters of the auto notification feature, such as the type of alert or number of alerts. The parameters provided by the auto notification feature may vary based on the manufacturer of the mobile terminal 100.

In the exemplary implementation of the auto notification, a first mode and a second mode are defined for the mobile terminal 100 to determine the type of action required by the processor 102. The first mode is considered as the initial mode, wherein the user has either acknowledge the receipt of one or more of the received message or the motion sensor 134 has detected motion before the expiration of predetermined time after the receipt of the message. While in the initial mode, an initial alert is provided upon receiving a message.

The second mode is considered as the sleep mode, wherein a message is received, however the user has not acknowledged the receipt of the message and motion is not been detected within the predetermined time. The sleep mode generally indicates that the mobile terminal 100 is placed away from the user and has not been moved for a period of time, such as a desk or a charger.

Upon activating the auto notification feature, the mobile terminal 100 is set to the initial mode and begins monitoring for incoming message. Upon receiving a proper message, the processor 102 determines if the mobile terminal 100 is in initial mode or the sleep mode. If the processor 102 determines that the mobile terminal 100 is in the initial mode, then an initial alert is executed. The user may define the initial alert as a standard alert selected from a list of alerts. The list of alerts may comprise a vibrate type alert, an audible type alert or a visual type alert. In executing the vibrate type alert, processor 102 uses the vibrate device 136 of the mobile terminal 100. In executing the audible type alert, the processor 102 may use the speaker 118 for a beep, the tone generator 116 for a tone or the speaker 118 for any predetermined voice pattern. In executing the visual type alert, the processor 102 may use the display device 110 or the LED 114. In an embodiment of the invention the standard alert is a vibrate type alert, wherein the processor 102 may switch to another alert type if the mobile terminal 100 is placed in a charger (not shown).

In the exemplary implementation, the timer is 128 is activated to determine length of time (total sleep time) that the motion sensor 134 did not detect any motion. If the motion sensor 134 does not detect any motion after a predetermine sleep time (sleep time greater than predetermined sleep time), the processor 102 places the mobile terminal 100 into second mode and the processor 102 continues monitoring for motion using the motion sensor 134.

If the processor 102 determines that the mobile terminal 100 is in the second mode, then a second alert is executed. The second alert is an efficient alert, one, which consumes the least amount of battery power, such as visual alert using an LED 114. When the user does not check a received message and motion was not detected for a period of time, then the second alter is executed for all the messages subsequently until the user acknowledges the receipt of one or more messages. The processor 102 may select the efficient alert from a list of alerts that consumes the least battery power. Furthermore, the processor 102 may select not to execute any alerts to conserve battery power if the message is received while the mobile terminal 100 is in the second mode. Upon determining the type of alert to execute, the processor 102 activates the motion sensor 134 of the mobile terminal 100 and begins monitoring for any motion of mobile terminal 100.

Upon detecting motion, the processor 102 determines the mode of the mobile terminal 100. If the mobile terminal 100 is in the initial mode (for example, if the motion was detected within the predetermined time), then the processor 102 resets the timer and maintains the mobile stations in initial mode. Otherwise, the processor 102 executes a third alert, herein referred to as a motion detected alert. In the preferred embodiment, the motion detected alert is a series of alerts that are executed if the processor 102 detects a motion while the mobile terminal 100 is in the sleep mode. Depending on the user's selection during the activation of the auto notification feature, different types of alerts (a vibrate alert, a beep alert, an LED alert, etc.) may be used to create the series of alerts. Also, the user may select a predetermine set of alerts that increase in strength, such as the loudness and length of an alert may increase for every repetition. For example, if an alert with three beeps was selected, then the second beep would be louder and longer than the first beep; and the third beep would be louder and longer than second beep.

At anytime during the monitoring or providing the alerts, if the user acknowledges the receipt of the one or more messages by actuating any key, any executing alert will discontinue and the mobile terminal 100 will be placed into initial mode and the total sleep time will be cleared.

Figure 2:
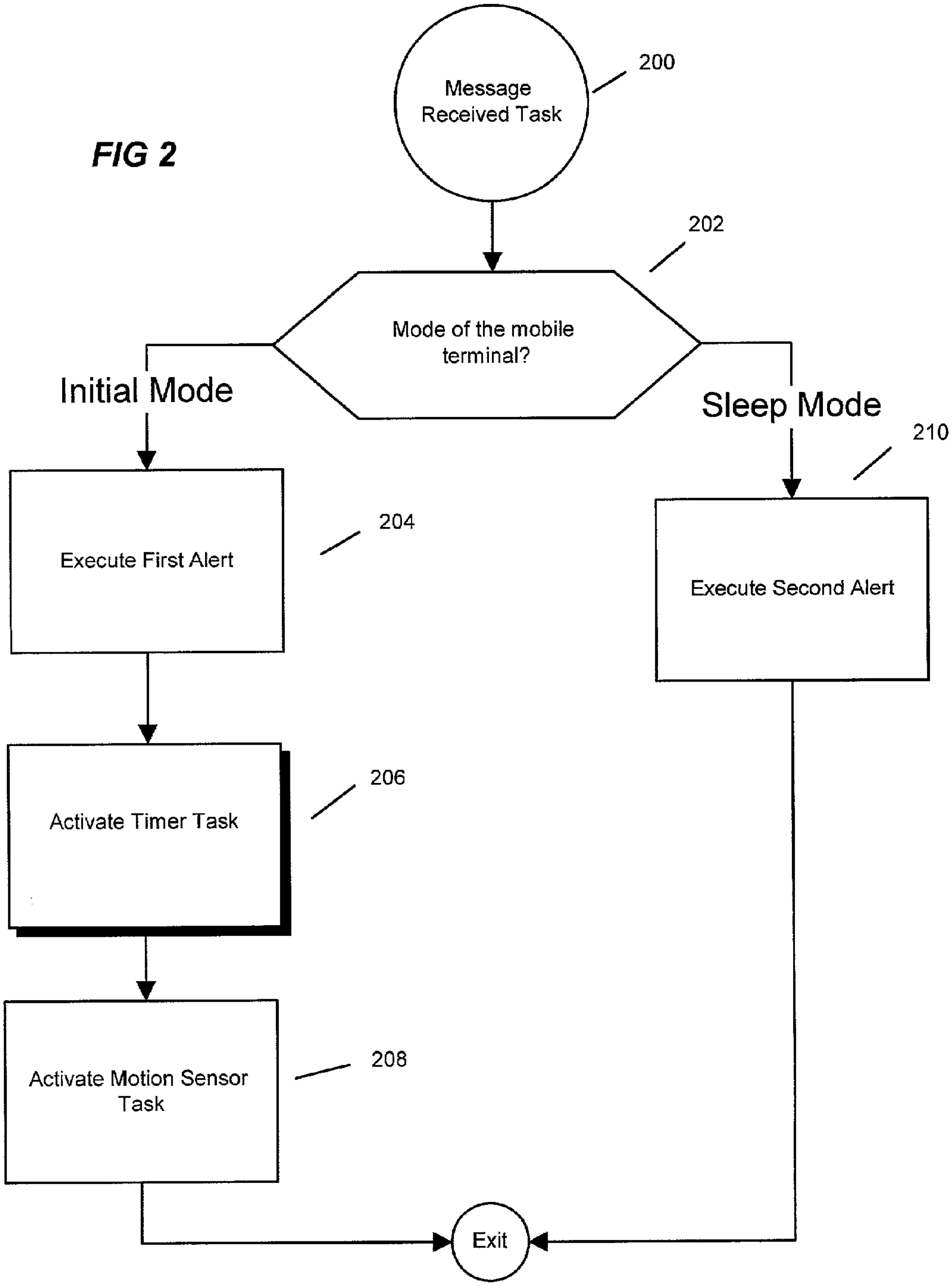
FIG. 2 shows software module of a message received task, depiction of an embodiment of the invention.

FIG. 2 describes a message received task 200 accordance to an embodiment of the invention. The message-received task 200 is activated upon receiving a message upon the user activating the auto notification feature and processor 102 begins monitoring for an incoming message. At block 202, the processor 102 determines the mode of the mobile terminal 100. In an embodiment of the invention, initial activation of the auto notification feature sets the mode of the mobile terminal 100 to initial mode. At block 202, if the processor 102 determines that the mode of the mobile terminal 100 is the initial mode, then block 204 is executed. At block 204, an initial alert is executed. The initial alert may be preset by the user, for example a vibrate alert or beep alert. Upon providing the initial alert, at block 206 a timer task is activated to begin calculating the total sleep time. At block 208, the processor 102 activates a motion sensor 134 to begin monitoring for any motion.

Referring back to block 202, if the processor 102 determines that the mode of the mobile terminal 100 is sleep mode, then block 210 is executed. At block 210, an efficient alert is executed. The efficient alert is an alert that is selected by the processor 102. In the preferred embodiment, the processor 102 determines and selects an alert from a list of alerts that will consume the least battery power. Furthermore, the processor 102 may determine provide no alerts, thereby conserving battery power. The alert type that consumes the least battery power may be pre-designated at the time of manufacturer. An advantage of providing an alert that consumes the least battery power will prolong the battery life, especially when the user may not be able to acknowledge receipt of any messages.

Figure 3:
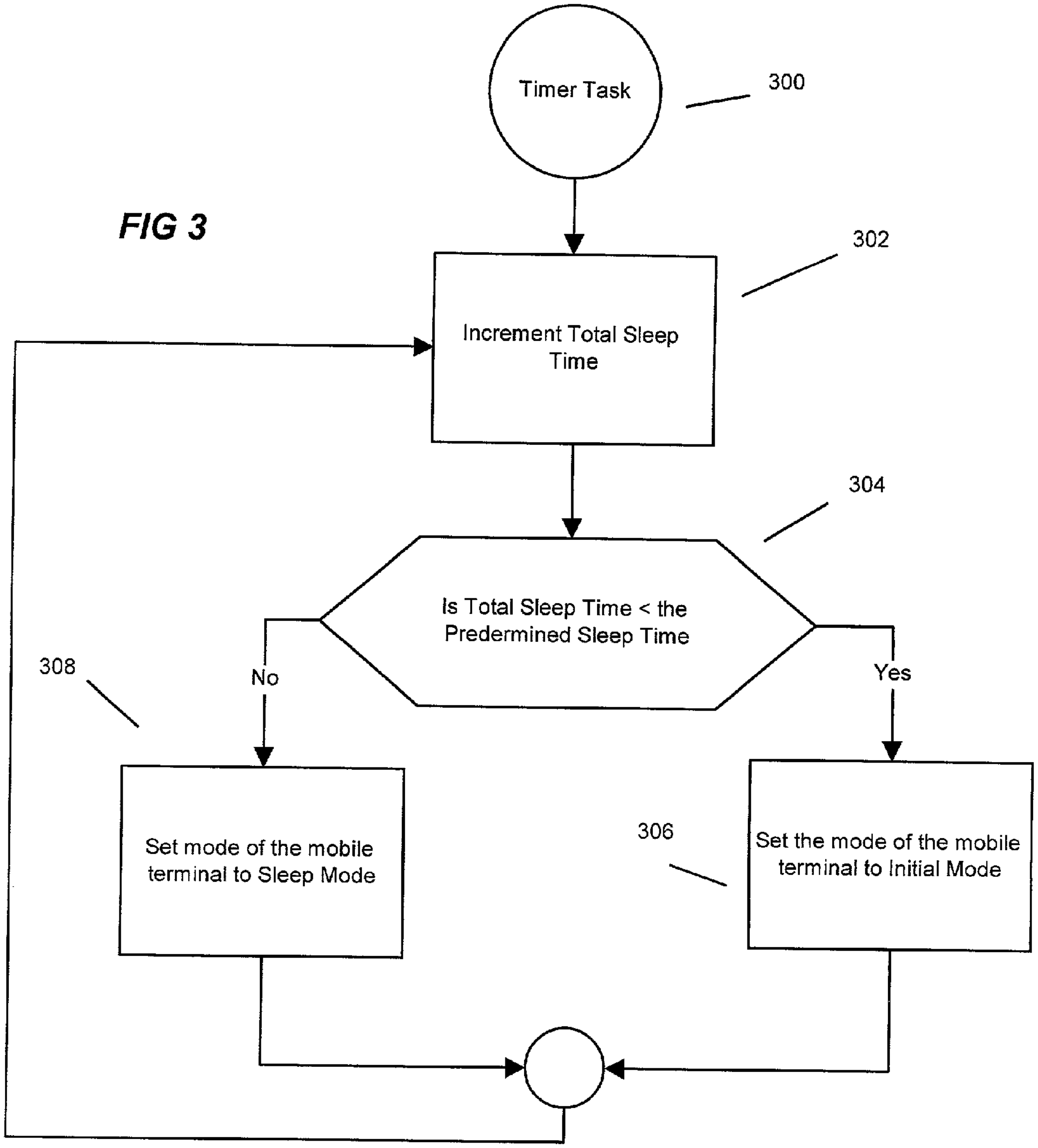
FIG. 3 shows software module of a timer task, depiction of an embodiment of the invention.

FIG. 3 describes a timer task 300 accordance to an embodiment of the invention. The timer task 300 is initially activated by the message received task 200 upon receiving a message. Once the timer task 300 is activated, it may continue operating in the background until the processor 102 interrupts the task 300. At block 302, the processor 102 begins incrementing the total sleep time using the timer 128. At block 304, the processor 102 determines if the total sleep time is less than the predetermined sleep time. If determined that total sleep time is less then the predetermined sleep time, then at block 306, the mode of the mobile terminal 100 is set to initial mode. Otherwise, at block 308, the mode of the mobile terminal 100 is set to sleep mode.

Figure 4:
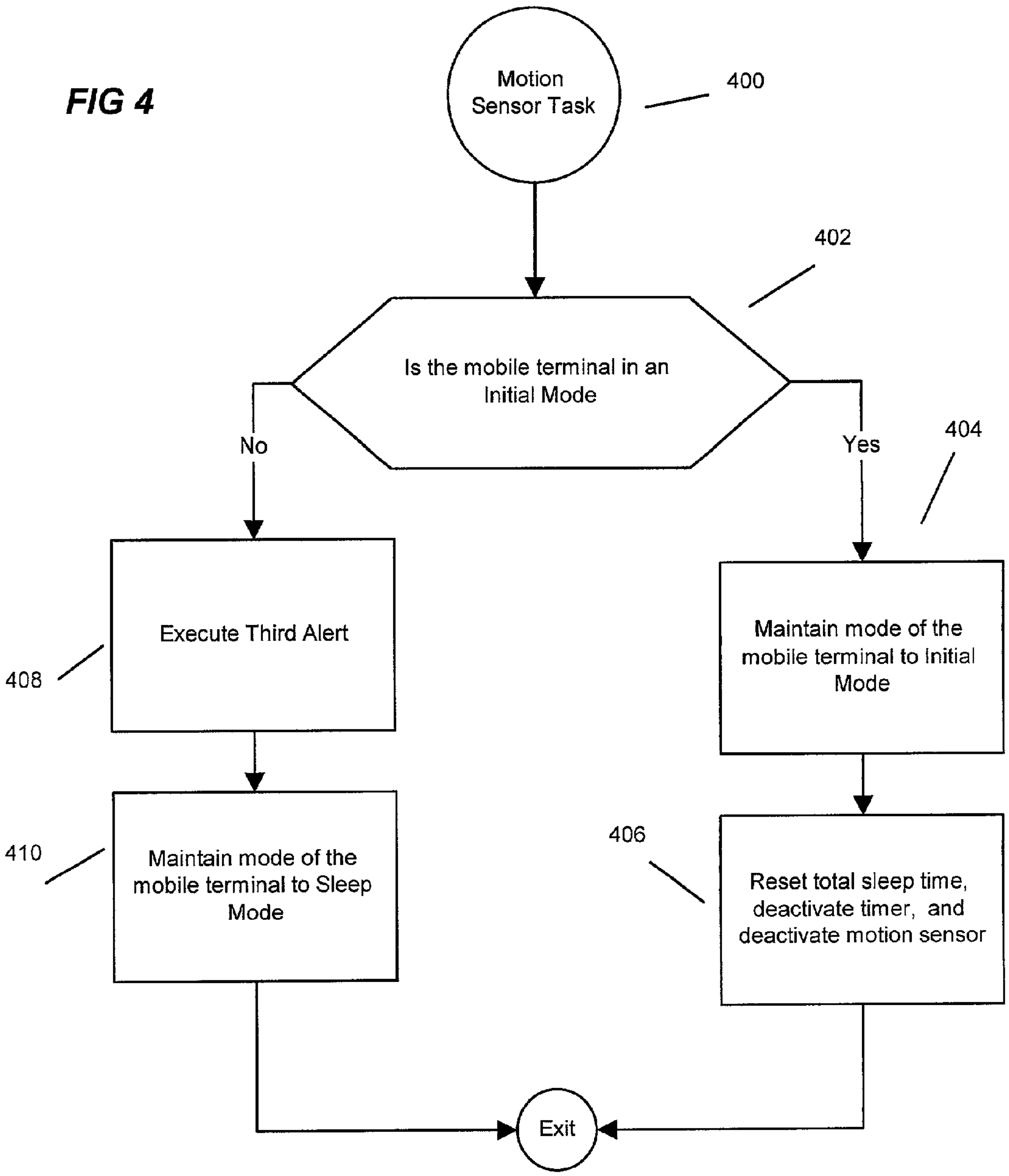
FIG. 4 shows software module of a motion detected task, depiction of an embodiment of the invention.

FIG. 4 describes a motion detected task 400 accordance to an embodiment of the invention. The motion detected task 400 by the processor 102 upon receiving an indication that motion was detected by the motion sensor 134. Also, according to an embodiment of the invention, the processor 102 accepts input from the motion sensor 134 upon the activation of the motion sensor 134 task by the message-received task 200, as described above. At block 402, the processor 102 determines if mode of the mobile terminal 100 is in initial mode. If the processor 102 determines that the mobile terminal 100 is in the initial mode, then block 404 is executed. At block 404, the mode of the mobile terminal 100 is maintained to be the initial mode. At block 406, the total sleep time is reset (for example sleep time set to zero), timer is deactivated and the motion sensor is deactivated.

Referring back to block 402, if the processor 102 determines the mode of the mobile terminal 100 was not the initial mode (for example, the mode of mobile terminal 100 is set to sleep mode), then block 408 is executed. At block 408, the processor 102 executes a motion detected alert. The motion detected alert may be a series of alerts comprising one of more alert from a list of alerts (a vibrate alert, audible alert or a visual alert). In the preferred embodiment, the processor 102 cycles through all the available alerts once. Each alert may be repeated three times, wherein each time the alert is executed, the strength and the duration of the alert may change. Upon executing the motion detected alert, at block 410, the mode of the mobile terminal 100 is maintained in the sleep mode.

As examples, the method and apparatus may also be implemented in electronic devices such as regular PDA, PDA with wireless communication capabilities, general-purpose computers, and devices having a wireless connection. The method and apparatus may be realized by implementing an operating mode, which may be modified by the user using a menu feature.

Thus, while the invention has been particularly shown and described with respect to preferred embodiments thereof, the above description is intended by way of example only and is not intended to limit the present invention in any way except as set forth in the following claims.

What is claimed is:

1. A method of providing a notification of a received message in an electronic device, the method comprising the steps of:

receiving, in the electronic device, the message;

activating a motion sensor for monitoring the motion of the electronic device;

detecting motion of the electronic device;

determining a first mode of the electronic device upon detecting a motion of the electronic device; and executing a first alert if it is determined that the first mode determined in the step of determining is a sleep mode, executing a second alert, if determined that the electronic device is in a second mode, wherein the second alert is selected from a list of alerts and consumes the least amount of battery power.

2. The method as claimed in claim 1, wherein the step of executing the first alert comprises a step of executing a standard alert selected by the user of the electronic device.

3. The method as claimed in claim 2, wherein the step of executing the standard alert comprises a step of executing a vibrate type alert.

4. The method as claimed in claim 2, wherein the step of executing the standard alert comprises a step of executing an audible type alert.

5. The method as claimed in claim 2, wherein the step of executing the standard alert comprises a step of executing a visual type alert.

6. The method as claimed in claim 1, further comprising the step of setting the mode of the electronic device, prior to the step of determining if the electronic device is set to the first mode or the second mode.

7. The method as claimed in claim 1, wherein the step of executing the first alert comprises a step of executing a set of alerts.

8. The method as claimed in claim 7, wherein the step of executing the set of alerts comprises a step of executing a plurality of same type alerts.

9. The method as claimed in claim 8, wherein the step of executing the plurality of same type alerts comprises a step executing each said same type alert with varying strength and duration.

10. The method as claimed in claim 7, wherein the step of executing the set of alerts comprises a step of executing a plurality of audible type alerts.

11. The method as claimed in claim 7, wherein the step of executing the set of alerts comprises a step of executing a plurality of visual type alerts.

12. The method as claimed in claim 7, wherein the step of executing the set of alerts comprises a step of executing a plurality of vibrate type alerts.

13. A electronic device for receiving a message, the electronic device comprising:

a motion sensor for detecting motion of the electronic device; and a processor, coupled to the motion sensor, the processor for determining a first mode of the electronic device upon detection of motion of the electronic device by the motion sensor; the processor further for executing a first alert if it is determined that the first mode determined by the processor is a sleep mode, the processor executes a second alert if the processor determines that the electronic device is in a second mode, wherein the second alert is executed from a list of alerts, at least one of the alerts consumes the least amount of battery power.

14. The electronic device as claimed in claim 13, wherein the first alert comprises a standard alert selected by the user of the electronic device.

15. The electronic device as claimed in claim 14, wherein the standard alert comprises a vibrate type alert.

16. The electronic device as claimed in claim 14, wherein the standard alert comprises an audible type alert.

17. The electronic device as claimed in claim 14, wherein the standard alert comprises a visual type alert.

18. The electronic device as claimed in claim 13, wherein the processor sets the mode of the electronic device, before said processor determines the first mode or the second mode of the electronic device.

19. The electronic device as claimed in claim 13, wherein the first alert comprises a set of alerts.

20. The electronic device as claimed in claim 19, wherein the set of alerts comprises a plurality of same type alerts.

21. The electronic device as claimed in claim 20, wherein the processor executes each of the plurality of same type alerts with varying strength and duration.

22. The electronic device as claimed in claim 19, wherein the set of alerts comprises a plurality of audible type alerts.

23. The electronic device am claimed in claim 19, wherein the set of alerts comprises a plurality of visual type alerts.

24. The electronic device as claimed in claim 19, wherein the set of alerts comprises a plurality of vibrate type alerts.

25. An electronic device for receiving a message, the electronic device comprising:

means for receiving, in the electronic device, the message;

means for activating a motion sensor for monitoring the motion of the electronic device;

means for detecting motion of the electronic device;

means for determining a first mode of the electronic device upon detecting a motion of the electronic device; and means for executing a first alert if determined that the first mode determined in the means for determining is a sleep mode, executing a second alert, if determined that the electronic device is in a second mode, wherein the second alert is selected from a list of alerts and consumes the least amount of battery power.

26. The electronic device as claimed in claim 25, wherein the list of alerts comprises a plurality of audible type alerts.

27. The electronic device as claimed in claim 25, wherein the list of alerts comprises a plurality of visual type alerts.

28. The electronic device as claimed in claim 25, wherein the list of alerts comprises a plurality of vibrate type alerts.

* * * * *